April 23, 1957     J. W. WALKER     2,789,820
OCCUPANT PROPELLED ROUNDABOUT
Filed March 25, 1955
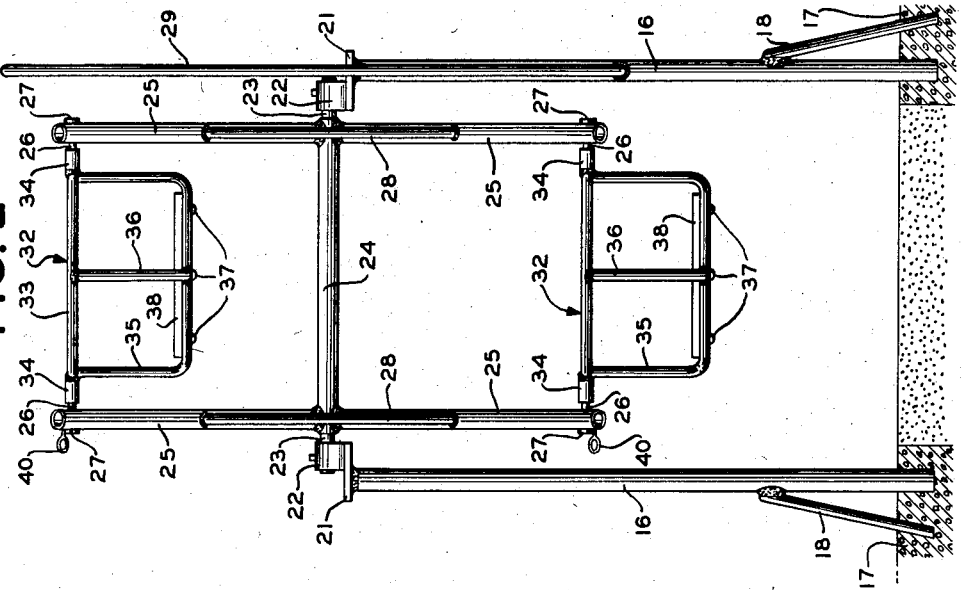
INVENTOR.
JOHN WALKER
BY
ATTORNEY

United States Patent Office 2,789,820
Patented Apr. 23, 1957

2,789,820
OCCUPANT PROPELLED ROUNDABOUT

John W. Walker, Wichita, Kans.

Application March 25, 1955, Serial No. 496,691

1 Claim. (Cl. 272—33).

The invention described herein relates to amusement apparatus for children, and the subject of the invention is a novel and valuable ferris wheel, characterized by a simplicity and ruggedness of construction adapted to afford a structure which not only can be readily and fairly inexpensively erected, as in a private or public playground, but which as so erected may be depended on to be particularly non-hazardous to children, during and between uses of the apparatus.

A special object of the invention is to provide, in a child's ferris wheel of the kind above described and having a plurality of passenger supporting seats suspended from a carrier mounted for rotation about a horizontal axis, improvements in the structure of a seat and in its manner of suspension, to facilitate a rider in mounting or leaving said seat easily and safely, to safeguard the rider against accidental falling from the seat, and to help each rider to do his or her part in making use of leg thrust against the ground to put the ferris wheel into rotation about said axis and to continue the rotation as long as desired.

Another special object is to provide, in combination with the rotatory carrier for said seats and a frame or stand having means at a suitably elevated point for mounting said carrier rotatably about said axis, a guard rail in the nature of a stabilizer ring, said rail fixed on said frame and in substantially a vertical plane, to provide, at any selected point therearound, as opposite a particular seat at any selected instant, a handhold for a child on that seat, to facilitate starting or stopping of the rotatory frame or, for instance, to restrain the frame against accidental turning during changing of riders.

A further special object is to provide, in combination with a child's ferris wheel having the features already mentioned, a ladder means partially carried by said frame and partially included in said carrier, for facilitating and making it safe for a child to enter or leave an upper seat when, although the said carrier is not rotating, help is not available to assist in loading the carrier with a child or children or to assist in unloading a child or children.

Still another special object is to provide, in a child's ferris wheel having four seats suspended from points spaced apart one from another by 90° about said axis, simple, inexpensive yet dependable means for readily locking said carrier against rotation by locking a particular seat to the frame, when said carrier is brought to any one of a plurality of different angular positions, that is, when the carrier has been rotated to locate any particular one of said seats in predetermined adjacency to a part of the locking means which is carried by said frame at a particular location thereon.

Still a further special object of the invention is to provide a ladder means as above mentioned wherein certain of what may be called the rung elements thereof are included in the structure of the carrier and in such manner that said rung elements coact with various elongate and radially extending members of the carrier to stiffen and fortify the latter.

Other desirable objects and the novel features through which the purposes of the invention are attained are set forth or will appear in the course of the following specification.

The drawing accompanying and forming part of the specification illustrates a present practical embodiment of the invention, but it will be appreciated that structure and operation may be further modified and changed, all within the true intent and broad scope of the invention as hereinafter defined and claimed.

Fig. 1 in the drawing shows said embodiment in side elevation; and

Fig. 2 is a view showing the same in end elevation, looking toward the left in Fig. 1.

Referring to the drawing more in detail, a frame or stand is shown which comprises a pair of like side structures each of inverted V-shape and made up of a pair of upwardly converging tubular rods 15 and 16. These rods are shown as having their lower ends embedded in concrete as at 17. Each rod 15 or 16 has welded thereto, as indicated, a bracing strut 18 with the lower ends of these struts embedded also in concrete.

At each side of the apparatus, between the rods 15 and 16, there are provided an upper tie rod 19 and a lower tie rod 20, each of these being shown as having its opposite ends welded to said rods 15 and 16.

The tops of each pair of rods 15 and 16 are shown as being secured together by having welded thereon a plate 21 carrying a bearing 22. The bores of these bearings are adapted to be horizontally aligned for having journalled therein the reduced opposite ends 23 of a shaft 24.

Said shaft 24, near each of the opposite ends thereof, has offset radially therefrom four tubular arms 25 spaced 90° apart. The eight arms 25, each welded at its inner end, as indicated, to the shaft 24, are arranged as will be seen from the drawing so that each arm 25 at one side of the apparatus is aligned with an arm 25 at the opposite side of the apparatus. Said eight arms are all alike and each near its outer end is apertured to allow, in the case of any arm 25 and the therewith aligned arm 25 at the opposite side of the apparatus, a pivot pin 26 having an enlarged head 27 to be passed through each of said apertures, with then said pivot pins axially aligned and parallel with the shaft 24, and hence with the axis of rotation of the rotatory carrier comprised of said shaft 24, the eight arms 25 and eight strut members 28 next to be referred to.

Said strut members 28 are arranged, four at each side of the apparatus, to outline at that side of the rotatory carriage a square in the same vertical plane as four of the radial arms 25, said members 28 being shown as welded at their ends to said arms.

At 29 and at one side of the apparatus is indicated a guard rail in the nature of a stabilizer ring. In the present case merely one such ring is shown, but it may be that a duplicate thereof would be installed at the opposite side of the apparatus. Said ring is shown as a circularly bent tubular rod, secured at its opposite ends as by welding, as indicated, to the pair of rods 15 and 16 at the right in Fig. 2, at points on said rods facing the points where there are welded to the rods the opposite ends of the upper tie rod 19 at that side of the apparatus.

For holding the upper part of the ring 29 rigidly in its intended placement as illustrated, a pair of upwardly and divergingly inclined auxiliary bracing rods 30 and 31 are shown, each at its upper end welded to the said ring, as indicated, and at its lower end welded or otherwise suitably secured to a portion (hidden in Fig. 2) of the plate 21 at the right in Fig. 2.

Each pair of pivot pins 26 aligned as aforesaid is for rotatatively suspending one of four chairs 32. All these chairs are alike and one only will be described in detail. Each chair 32 includes a front rail 33 of U extension in top plan and merging at the outer ends of the arms of the U into aligned collars 34 each for receiving one of said pair of pivot pins. Said pins, because of their enlarged heads 27, are restrained against too close an approach one toward the other; and any suitable means, as cotter-pins (not shown), may be employed at matching apertures through the pivot pins and the collars 34, to prevent a too far movement of one pivot pin away from the other and so to mount the chair 32 securely on the pivot pins and hence rotatively on the rotatory carriage, and yet permit the pivot pins to be readily removed when desired to replace chairs.

Each chair 32 also includes, dependent from the inner ends of the collars 34, a hanger rail 35 of U extension in elevation and, dependent from a central point along the length of front rail 33, a straddle rail 36. Said straddle rail 36 is L-shaped, as shown best in Fig. 1, with the upright limb of the L downwardly inwardly inclined toward the hanger rail 35, and with the bottom limb of the L extended to a central point along the bottom stretch of the hanger rail 35. As indicated in the drawing, the connections between the collars 34 and the front rail 33 and the upper ends of the hanger rail 35 may be welds, as also may be the connection between the front rail 33 and the upper end of the straddle rail 36, and the connection between the bottoms of the hanger rail 35 and the straddle rail 36. Suitably secured to the said bottoms of the rails 35 and 36, as by means of the fastenings indicated at 37, is a flat seat 38, as one of wood.

At the side of the apparatus seen in Fig. 1, on the rod 16, is hung a hook 39, and for selective coaction with said hook, by manual use of the latter, there are four eyes or rings 40. Each of these eyes is at the outer end of one of the four arms 25 of the rotatory carrier, at the side of the apparatus seen in Fig. 1.

In use, one child is seated in each of the four chairs 32, facing toward the right in Fig. 1, with the child's legs straddling the straddle rail 36 and dangling down toward the right in Fig. 1, away from the seat 38. The center of gravity of the child's body is directly below the axis of alignment of the pivot pins 26, with the child's torso erect and with arms slightly extended so that hands grasp the front rail 33. The posture of each child is thus such that turning of the ferris wheel may be started by gentle back swing and forward thrust of a foot or the feet against the ground, until the wheel is turning in a counter-clockwise direction in Fig. 1 at the desired speed; while halting or slowing of the turning movement may be effected at any time by foot drag against the ground, by grasp of the stabilizer ring 29, or both. The mere presence of said ring is important to a child for the first time on the ferris wheel, and always to the unusually nervous or timid child; and should such a child become suddenly panicky, it may obtain reassurance by putting out a hand and grasping said ring. Also, the ring may be conveniently manually seized by any one, on the ground getting in a chair.

In loading or unloading, the chairs 32 may be, one after another, brought down to a point where the bill of the hook 39 is engaged with the eye 40 adjacent to said chair, and while the ferris wheel is thus temporarily held against turning, a child can readily become seated in the thus hook-engaged and hence lowermost chair. Or, all four chairs 32 may take on their passengers immediately following engagement of the hook 39 with the eye 40 adjacent to any chair 32. Then, with one or both of the two lower chairs entered by a child or children climbing in directly from the ground, the upper chair or chairs may be climbed to by way of a ladder means afforded by the tie rods 19 and 20 and the strut members 28. It will be noted that when the hook 39 is engaged with any one of the eyes 40, there will be two of the strut members 28, one above the other, which will be substantially horizontal, and hence useful as ladder rungs in combination with utilization of the tie rods 19 and 20 also as ladder rungs.

As already in effect stated, changes and modifications are possible within the scope of the invention as claimed, and parts of the improvements may be used without others. For example, while in the illustrative structure shown in the drawing, four arms 25 and four chairs 32 are present, it is to be understood that two only of said arms, 180° apart, or any number of said arms, more or less than four, spaced equally one from another, may be included in the rotatory carrier.

What is claimed is:

A child's ferris wheel comprising a pair of spaced, inverted V-shaped frame members, a horizontal shaft journaled at the apex of each of said frame members, a rotary carrier carried by said shaft, said carrier having a plurality of pairs of radially extended arms adjacent each end of said shaft, child holding chairs rotatably suspended between each pair of said arms near their extremities, each of said chairs including U-shaped seat carrying hangers having collars at the ends of same pivotally connected with the arms of the carrier, forwardly extended U-shaped handle bars connected at the ends with collars, straddle rails extending from the front rails to said hangers, seats supported on said connected hangers and straddle rails, said chairs being open at the back to enable safe and quick loading and unloading of the chairs at the bottom of the carrier, a fixed, vertically disposed, circular guard rail positioned on one side of said arms and having its opposite free ends thereof secured to opposite sides of one of said V-shaped frame members and being held in rigid support thereby, the circular configuration of said guard rail being in substantial conformity with the arc defined by the radially extended arms when in rotation, thereby enabling the occupants of each chair to grasp the rail member at any time during rotation of said arm members.

References Cited in the file of this patent
UNITED STATES PATENTS

| | | |
|---|---|---|
| 1,053,100 | Lyda | Feb. 11, 1913 |
| 1,683,237 | Brown | Sept. 4, 1928 |
| 1,823,318 | Dick | Sept. 15, 1931 |
| 2,537,399 | Doris | Jan. 9, 1951 |
| 2,550,974 | Corsere | May 1, 1951 |